Nov. 22, 1966 TOSHIO MORIMOTO 3,286,943

AUTOMATIC RECIPROCATING MAGNETIC TAPE RECORDING AND REPRODUCING APPARATUS

Filed June 3, 1963 19 Sheets-Sheet 1

INVENTOR.
Toshio Morimoto
BY
Stevens, Davis, Miller & Mosher
Attorneys

INVENTOR.
Toshio Morimoto
BY
Stevens, Davis, Miller & Mosher
Attorneys

INVENTOR.
Toshio Morimoto
BY
Stevens, Davis, Miller & Mosher
Attorneys

INVENTOR.
Toshio Morimoto
BY
Stevens, Davis, Miller & Mosher
Attorneys

INVENTOR.
Toshio Morimoto
BY
Stevens Davis Miller & Mosher
Attorneys

INVENTOR
BY Toshio Morimoto
Stevens, Davis, Miller & Mosher
Attorneys

Nov. 22, 1966 TOSHIO MORIMOTO 3,286,943

AUTOMATIC RECIPROCATING MAGNETIC TAPE RECORDING AND REPRODUCING APPARATUS

Filed June 3, 1963 19 Sheets-Sheet 7

INVENTOR.

Toshio Morimoto

BY

Stevens, Davis, Miller & Mosher

Attorneys

INVENTOR.
Toshio Morimoto
BY
Stevens Davis Miller & Mosher
Attorneys

INVENTOR.
Toshio Morimoto
BY
Stevens Davis Miller & Mosher
Attorneys

INVENTOR
Toshio Morimoto
BY
Stevens, Davis, Miller & Mosher
Attorneys

Inventor
Toshio Morimoto
By Stevens, Davis, Miller & Mosher
Attorneys

INVENTOR.
Toshio Morimoto
BY
Stevens, Davis, Miller & Mosher
Attorneys

Nov. 22, 1966 TOSHIO MORIMOTO 3,286,943

AUTOMATIC RECIPROCATING MAGNETIC TAPE RECORDING AND REPRODUCING APPARATUS

Filed June 3, 1963 19 Sheets-Sheet 13

INVENTOR.

Toshio Morimoto

BY

Stevens, Davis, Miller & Mosher

Attorneys

INVENTOR.
Toshio Morimoto
BY
Stevens, Davis, Miller & Mosher
Attorneys

Nov. 22, 1966 TOSHIO MORIMOTO 3,286,943

AUTOMATIC RECIPROCATING MAGNETIC TAPE RECORDING AND REPRODUCING APPARATUS

Filed June 3, 1963 19 Sheets-Sheet 15

INVENTOR.
Toshio Morimoto
BY
Stevens, Davis, Miller & Mosher
Attorneys

INVENTOR.
Toshio Morimoto
BY
Stevens Davis Miller & Mosher
Attorneys

INVENTOR.
Toshio Morimoto
BY
Stevens Davis Miller & Mosher
Attorneys

Nov. 22, 1966 TOSHIO MORIMOTO 3,286,943

AUTOMATIC RECIPROCATING MAGNETIC TAPE RECORDING AND REPRODUCING APPARATUS

Filed June 3, 1963 19 Sheets-Sheet 18

INVENTOR.

Toshio Morimoto

BY

Stevens Davis Miller & Mosher

Attorneys

INVENTOR.
Toshio Morimoto
BY
Stevens, Davis, Miller & Mosher
Attorneys

United States Patent Office 3,286,943

Patented Nov. 22, 1966

3,286,943

AUTOMATIC RECIPROCATING MAGNETIC TAPE RECORDING AND REPRODUCING APPARATUS

Toshio Morimoto, Osaka, Japan, assignor to Matsushita Electric Industrial Co., Osaka, Japan, a corporation of Japan Filed June 3, 1963, Ser. No. 285,135
Claims priority, application Japan, June 4, 1962, 37/23,068, 37/29,851; July 20, 1962, 37/40,862; July 27, 1962, 37/42,262
7 Claims. (Cl. 242—55.12)

This invention relates to magnetic tape recording and reproducing apparatus and particularly to those for use with a magnetic tape having two or more recording tracks. The present invention has for its object to provide an improved automatic apparatus of the type described which is capable of performing sound recording and reproduction upon such tape uninterruptedly over the combined extent of the tracks.

Years have passed since the advent of the magnetic tape recording and playback system. At present, the magnetic tape recording and reproducing system is in wide use as means for furnishing a convenient sound medium for disc recording or broadcasting, as means of television recording and also as memory means for electronic computers because of its versatile practical advantages such as the simplicity of the recording operation necessitating no scrupulous attention on the operator's side, capability of immediate reproduction, of the recorded sound, and that of high fidelity and minuteness, and erasability of the recorded sound permitting repeated recording on the same tape.

Also, because of these features, the magnetic tape recording and reproduction is growing popular among the general public as a convenient means of enjoying music, recording a session, lecture or address, learning foreign languages, taking a memorandum, or mailing human voices.

On the other hand, with the various features including excellent performances, the magnetic tape recording involves some deficiencies to be eliminated. Firstly, the magnetic tape as a recording medium is so thin and delicate having a thickness of from 25/1000 mm. to 50/1000 mm. that a considerable care is required in its handling. Particularly, in a reciprocating type magnetic recording and reproducing system employing a double-track or four-track magnetic tape, it has been necessary to turn over the spools accommodating such tape each time the direction of tape travel is changed. Thus, for example, during reproduction of a recorded music or lecture, the spools must be turned over at the end of each tape travel for the purpose of continuing the reproduction. During the time of turning the spools over, the reproduction must evidently be interrupted.

Similarly, the recording operation must previously be interrupted during the time required to turn the tape spools over. A magnetic record obtained in this manner obviously cannot afford any satisfactory reproduction, for example, of a music. This is a critical drawback of the conventional tape recording system particularly when any important subject is to be recorded.

Various proposals have been made to overcome these deficiencies. In one proposal, the tape is automatically rewound on a spool and subsequently paid out therefrom. In another, the change of the direction of tape travel is manually effected while at the same time the recording and reproducing heads are switched to serve contrariwse for cooperation with another sound track instead of manually turning the spools over. It has also been proposed to perform such direction change in an automatic fashion.

Most of these proposals, however, have been unsatisfactory in practice as they involve excessive cost, complicated structure, or a substantial loss of time in changing the direction of tape travel.

The present invention is intended to overcome these difficulties and provides a magnetic tape recording and reproducing apparatus which is simple in structure and adapted to fully automatically perform substantially uninterrupted sound recording and reproducing operation with an extremely limited time requirement for the change in the direction of tape travel.

The above and other objects, features and advantages of the present invention will become apparent from the following description when taken in conjunction with the accompanying drawings, which illustrate some preferred embodiments of the invention and in which.

Figure 4:
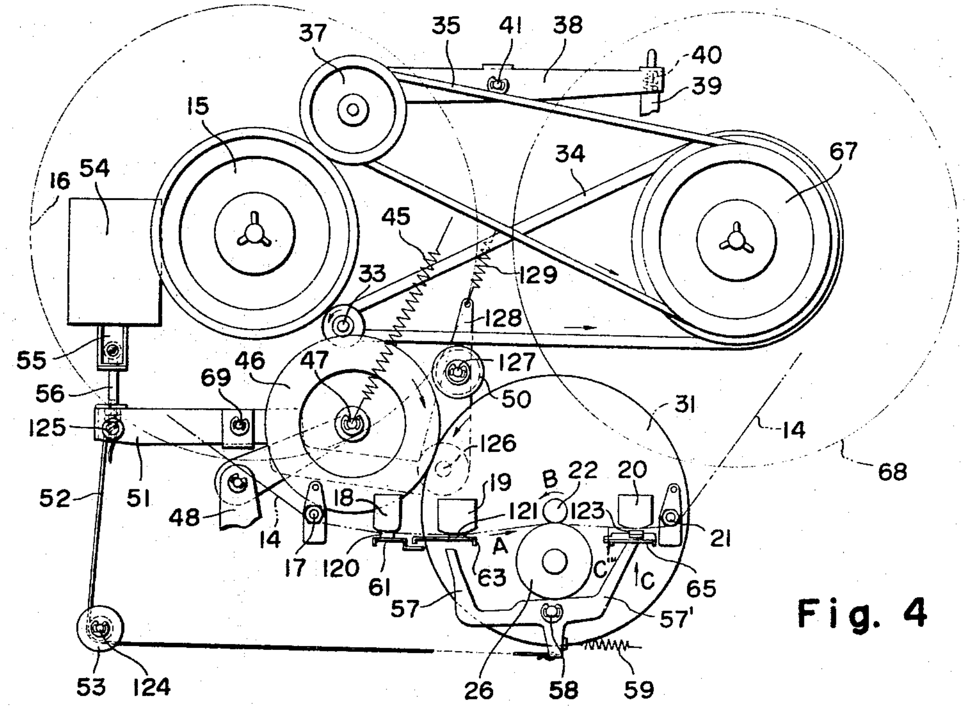
FIG. 4 is a top plan view showing major parts of the embodiment in the normal or forward travel position.
Figures 12A, 12B:
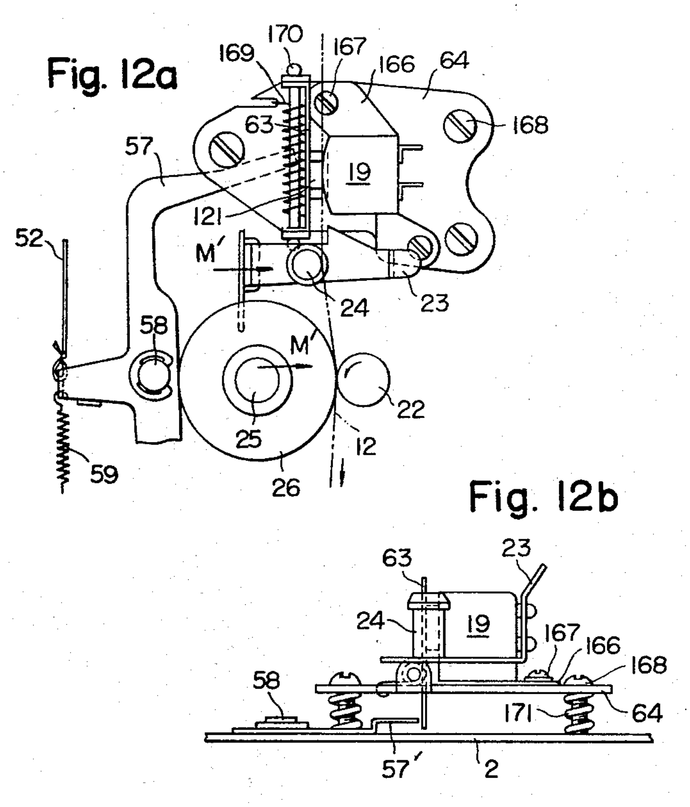
Figures 13A, 13B:
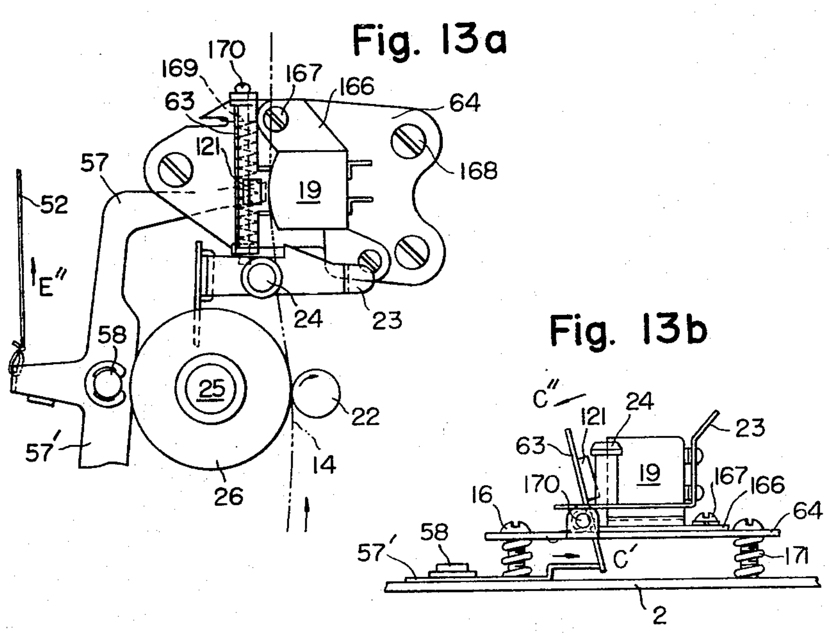
Figures 14A, 14B:
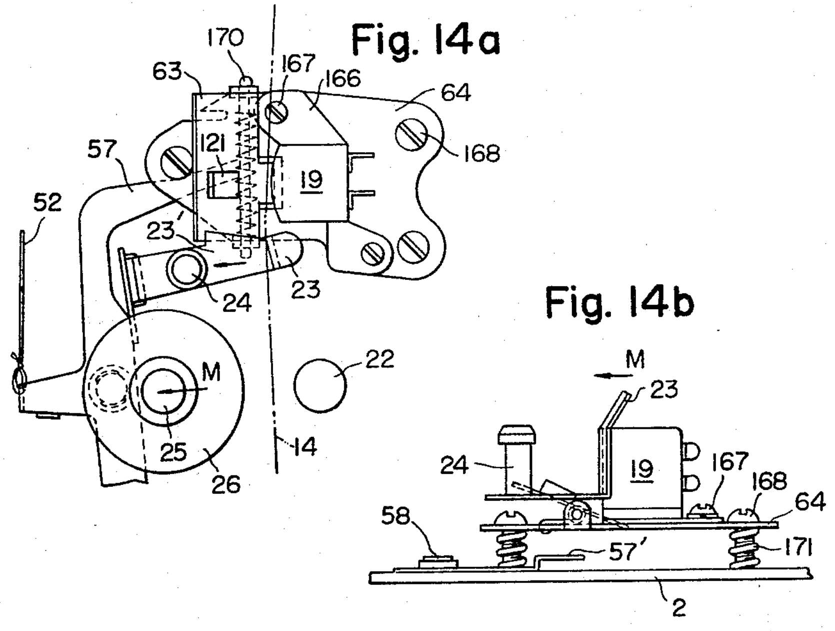
Figure 15:
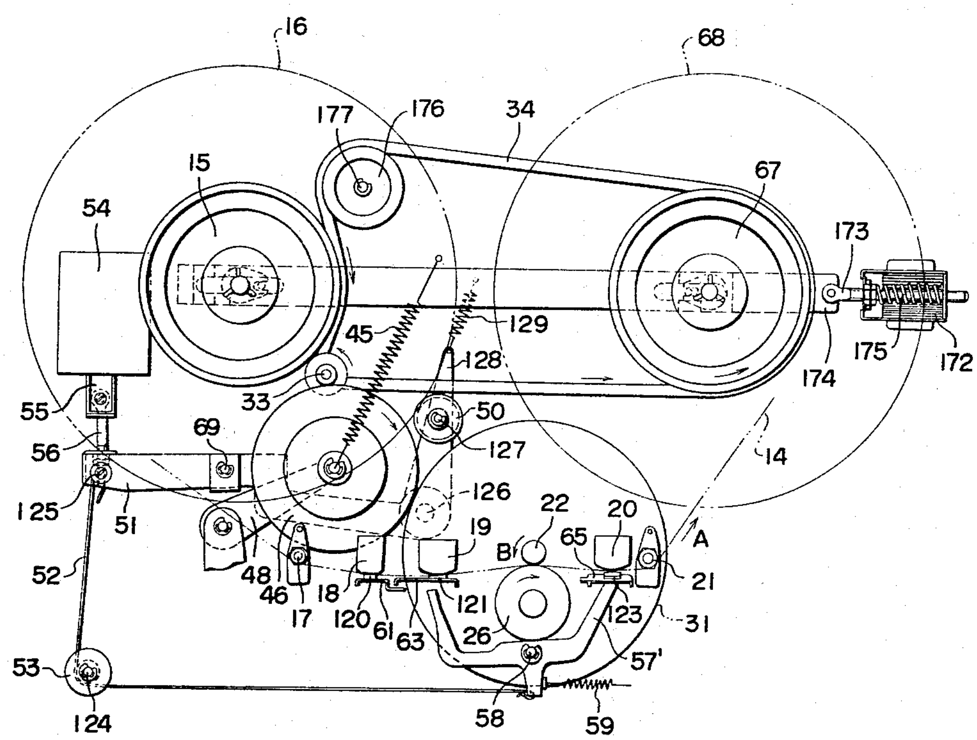
Figure 16:
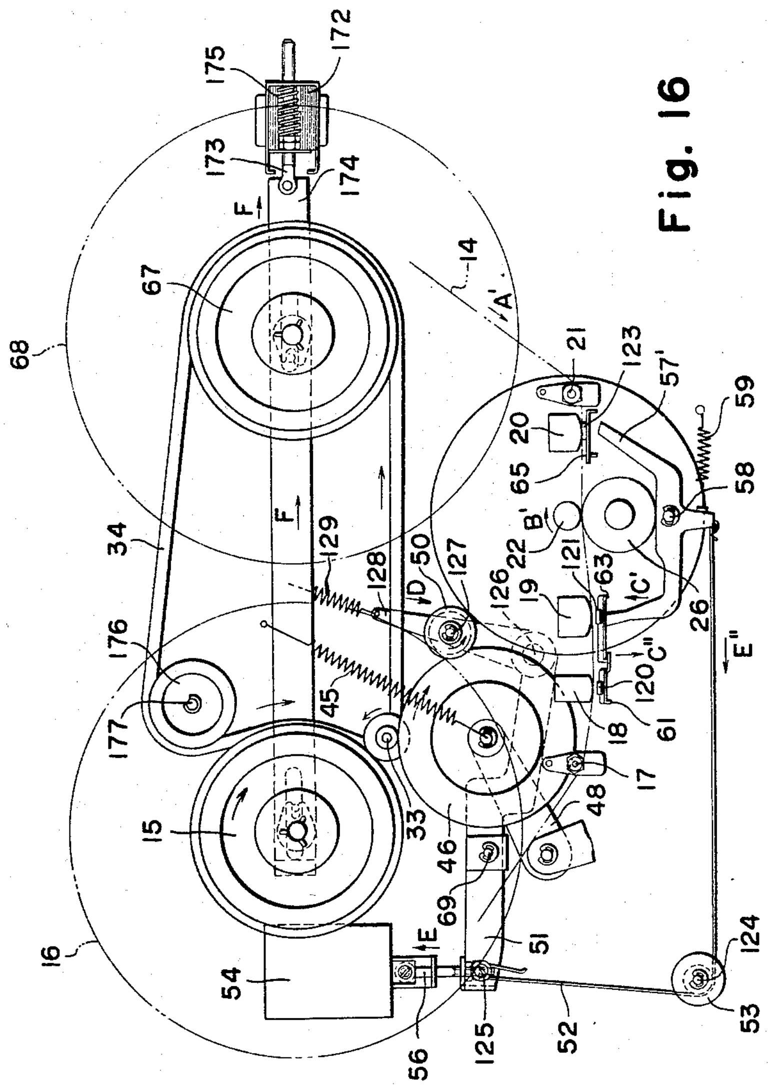
Figure 17:
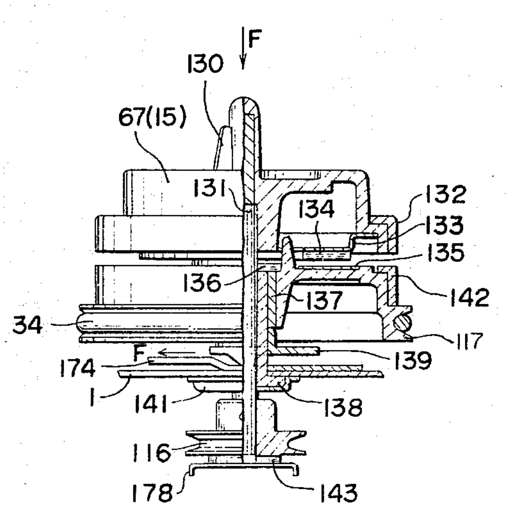
Figure 18:
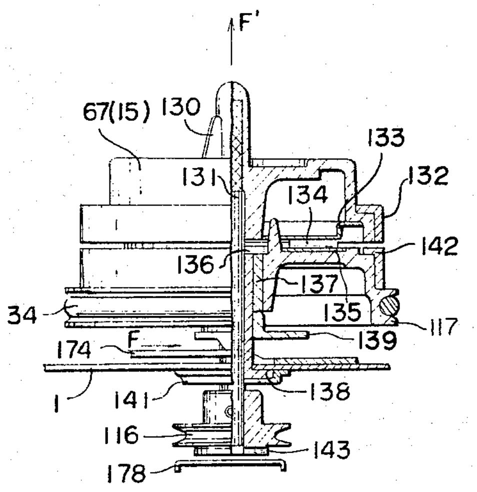
Figure 19:
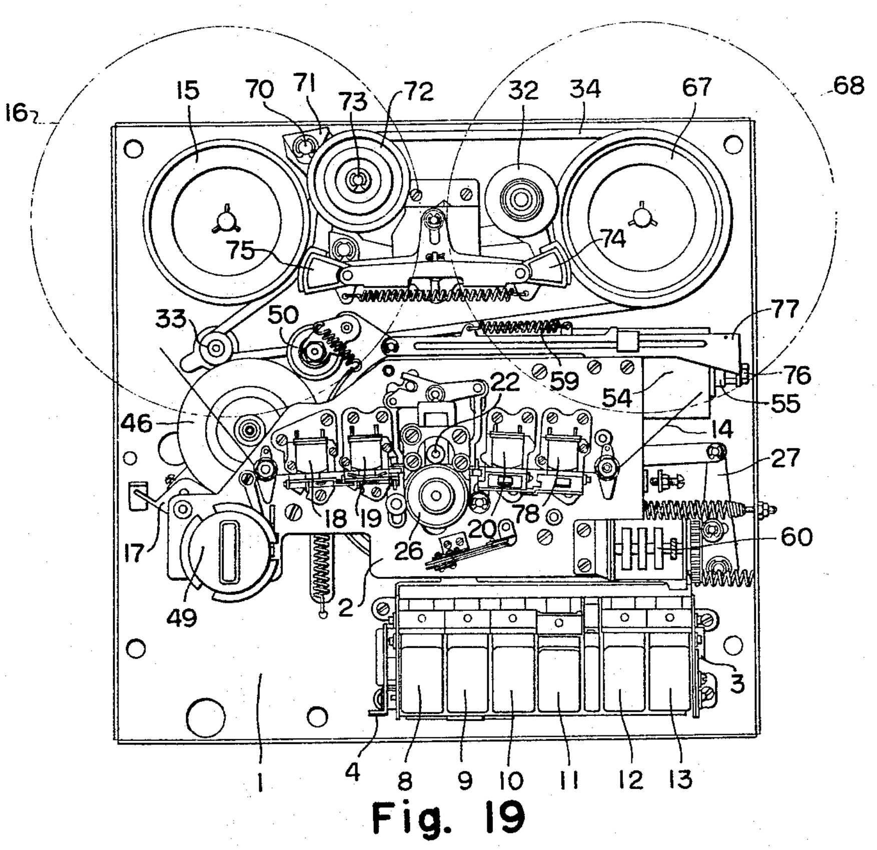
Figure 20:
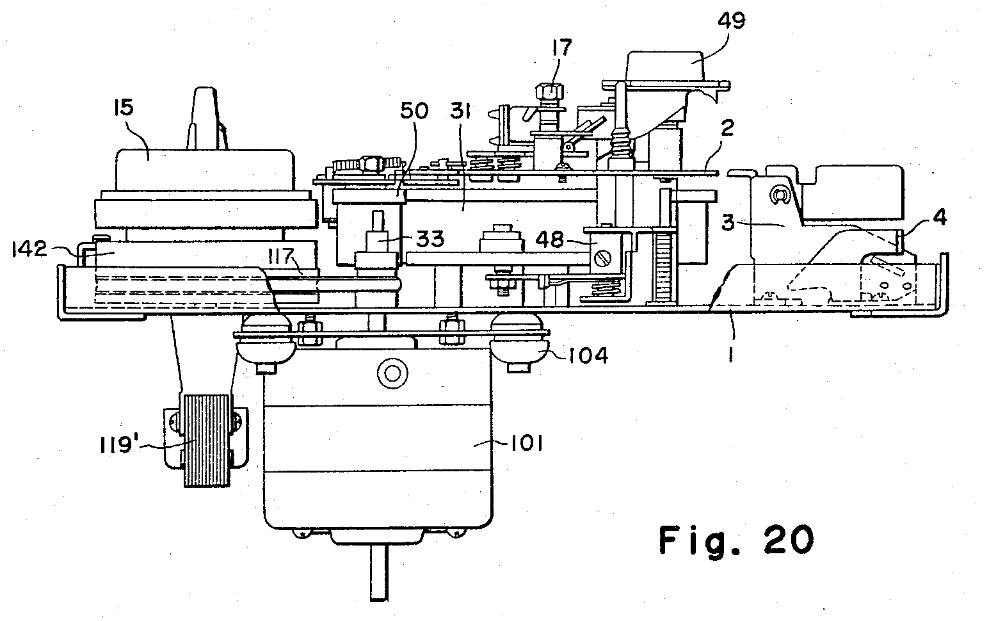
Figure 21:
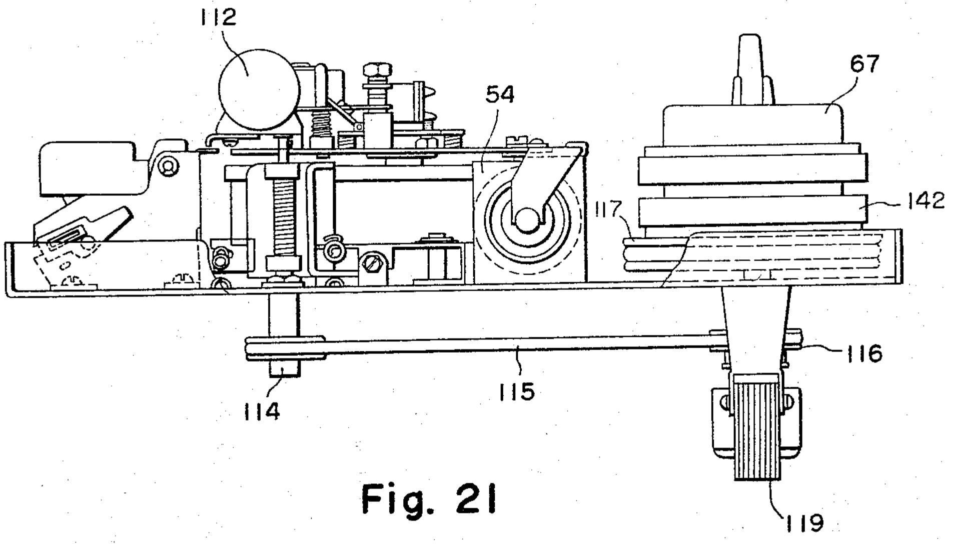
Figure 22:
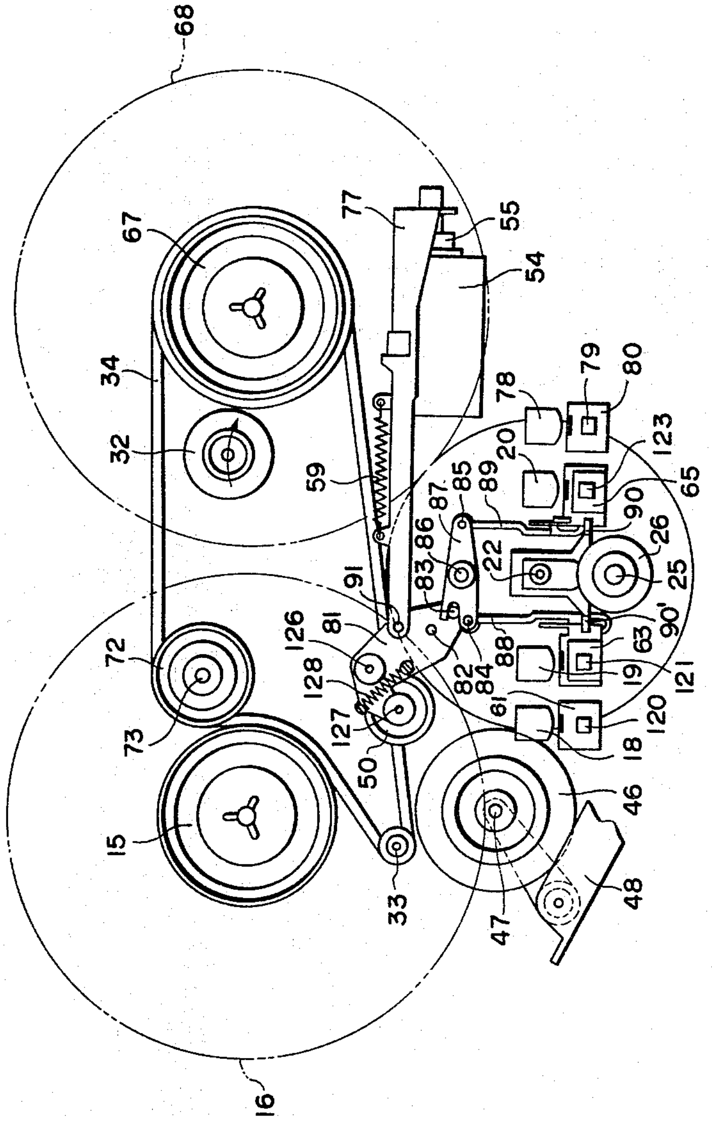
Figure 23:
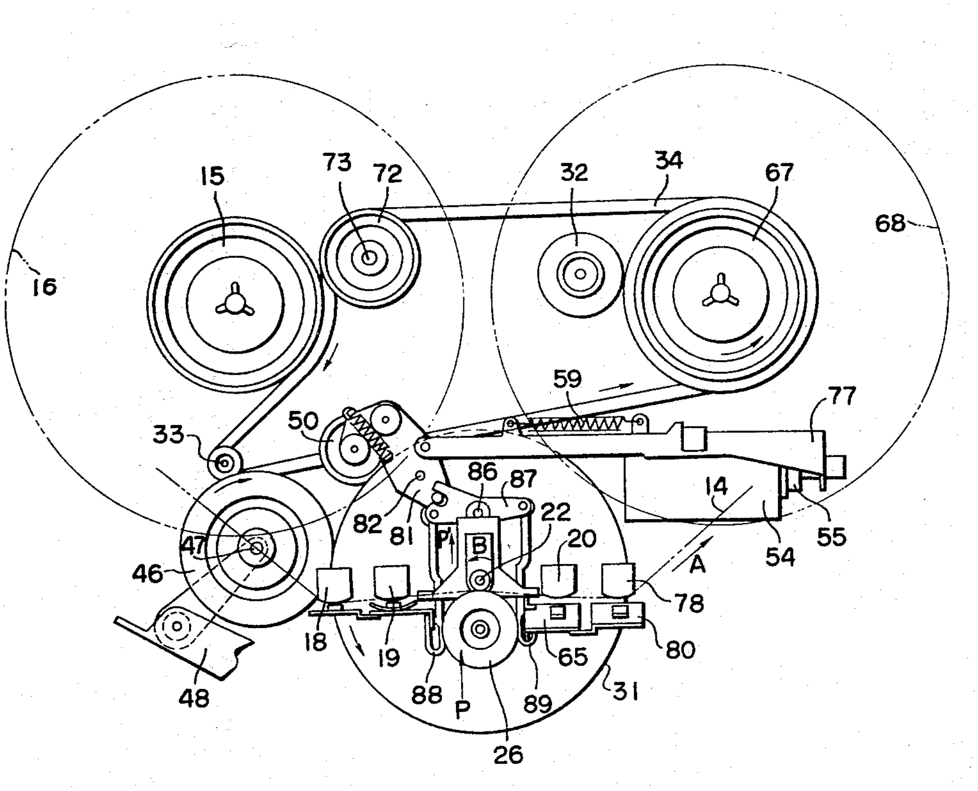
Figure 24:
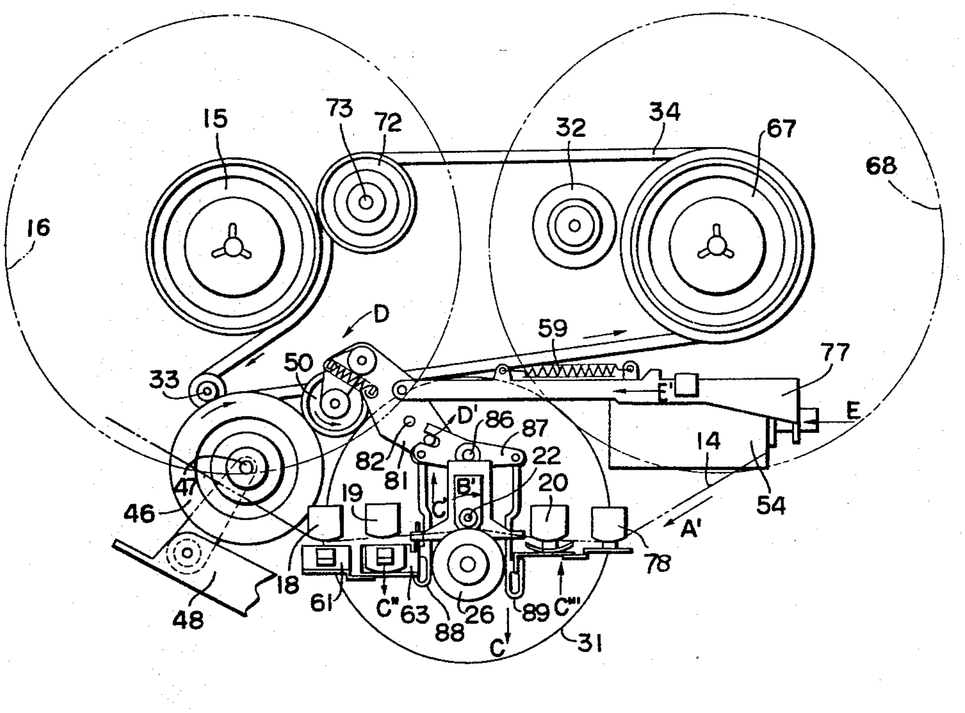
Figure 26A:
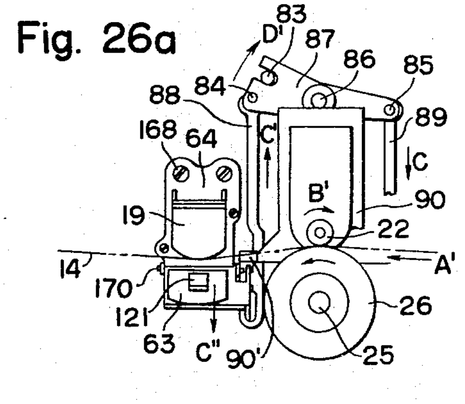
Figure 26B:
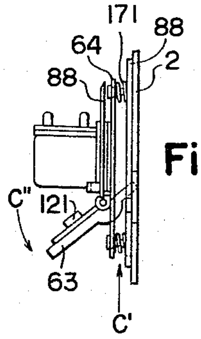
Figure 25A:
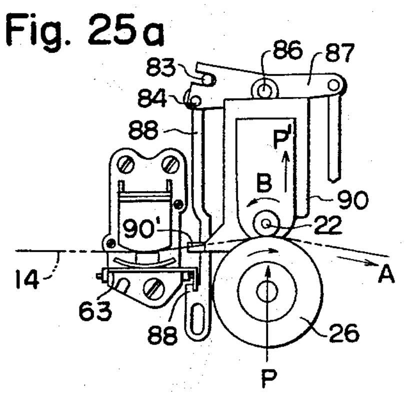
Figure 25B:
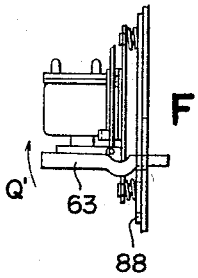
Figure 27A:
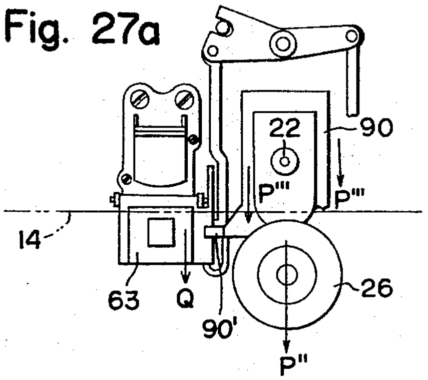
Figure 27B:
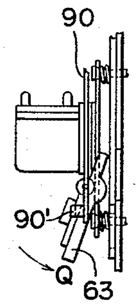
Figures 28, 29:
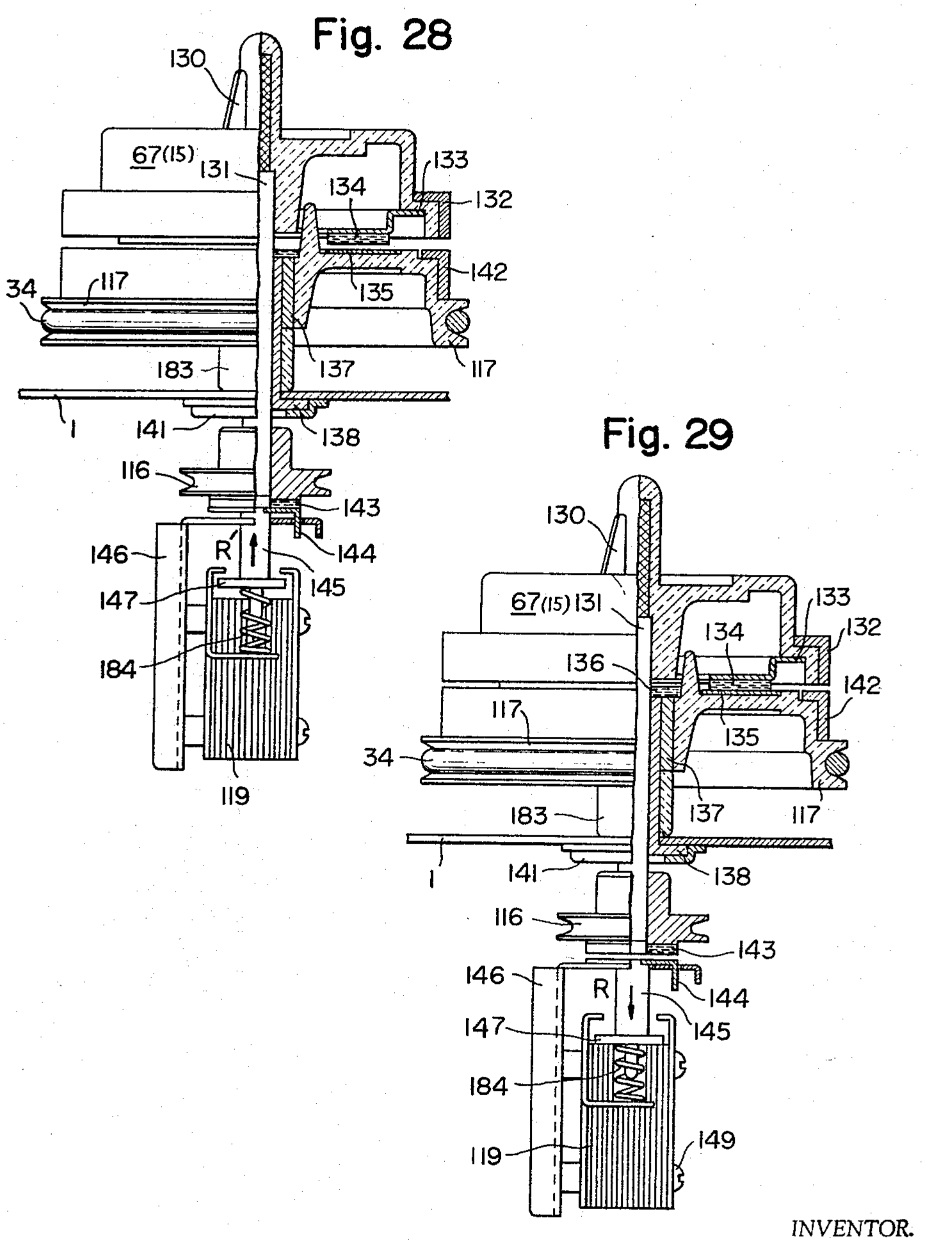

FIGS. 12*a* and 12*b* are plan and side views, respectively, of one of the magnetic head assemblies in the normal position;

FIGS. 13*a* and 13*b* illustrate the same in the reverse position;

FIGS. 14*a* and 14*b* illustrate the same in the stop-fast forward-rewind position;

FIG. 15 is a view similar to FIG. 4 illustrating major parts of another embodiment of the invention in the normal position;

FIG. 16 is a view similar to FIG. 15 illustrating the same in the reverse position;

FIG. 17 is an elevational view, partly in section, showing the left reel wheel in the normal position or the right reel wheel in the reverse position;

FIG. 18 is a view similar to FIG. 17 showing the left reel wheel in the reverse position or the right reel wheel in the normal position;

FIG. 19 is a top plan view of a further embodiment of the invention;

FIGS. 20 and 21 are a left and a right elevational view of same;

FIG. 22 illustrates the embodiment of FIGS. 19 to 21 in the stop position;

FIGS. 23 and 24 illustrate the embodiment in the normal and reverse positions, respectively;

FIGS. 25*a* and 25*b* are plan and side views, respectively, of one of the magnetic head assemblies of the embodiment in the normal positions;

FIGS. 26*a* and 26*b* illustrate the same in the reverse position;

FIGS. 27*a* and 27*b* illustrate the same in the stop-fast forward-rewind position;

FIG. 28 illustrates the left reel wheel of the embodiment in the normal or stop-fast forward-rewind position or the right reel wheel in the stop-fast forward-rewind or reverse position; and FIG. 29 illustrates the right reel wheel in the normal position or the left reel wheel in the reverse position.

Referring to the drawings, and first to FIGS. 1 to 5, which illustrate one embodiment of the invention, reference numeral 1 designates a base plate on which all the other components are mounted including a subbase plate 2 carrying magnetic head assemblies.

A magnetic tape 14 extends between a tape spool 16 mounted on a left reel wheel 15 and another tape spool 68 mounted on a right reel wheel 67. A drive or motor pulley 33 is secured to the shaft of a motor 101 for the purpose of driving a capstan 22 opposed by a pinch roller 26 as of rubber with the tape 14 nipped therebetween. In operation the tape 14 is driven at a predetermined speed to proceed from the supply spool 16 over a left sensing and guide pole 17, an eraser head 18 for normal tape travel, a magnetic head 19 for normal tape travel, and a guide pole 24 and further over a guide and pushing pole 28, a magnetic head 20 for reverse travel and a right sensing and guide pole 21 to be wound on the take-up spool 68.

A pushbutton device 3 is provided for operation of the apparatus. A button 8 is employed for tape rewinding; a button 9 for tape stop; a button 10 for fast-forward travel; and a button 11 for reproduction. A button 12 is depressed together with the button 11 for sound recording; and a button 13 is employed for instant stop. To run the tape 14, button 11 is depressed to operate a link mechanism 27 and a presser spring 29 so as to press the pinch roller 26 against the capstan 22. The pinch roller 26 is freely rotatably mounted on a shaft 25.

Reference numeral 7 designates a volume knob for controlling the quality of sound and 5 another volume knob and power switch for controlling the volume of sound. A lever 6 is secured to the volume knob 5 and, when operated to switch off the power, strikes a restoring lever 4 associated with pushbutton 3 to restore any depressed button.

The motor 101 together with a starting capacitor 102 is secured to the base plate 1 by way of a cushioning device 104. The motor or drive pulley 33, secured to the shaft of the motor, has different diameter portions to permit the tape to travel at different speeds. A speed change knob 49 is provided for cooperation with a shaft 110 to which an arm 48 associated with an idler or intermediate wheel 46 is secured. Thus, when the knob 49 is rotated the shaft 110 is vertically moved together with the idler wheel 46 so as to position the latter opposite to the desired diameter portion of the motor pulley 33. In the normal position for sound recording and reproduction, drive power is transmitted from the motor pulley through the idler wheel 46 to a flywheel 31 integral with the capstan 22.

A rubber belt 34 is trained over the motor pulley 33 for the purpose of driving a right reel pulley 117. A fast-forward roller 32 is disposed for cooperation with the right reel wheel 67 and, when the button 10 is operated, is pressed against both the wheel 67 and pulley 117 so that power is transmitted from the motor pulley 33 directly to the right reel wheel 67.

A rewind roller 44 is disposed for cooperation with the left reel wheel 15 and upon operation of the button 8 swings in the direction indicated by the arrow (FIG. 1) to press the rubber belt 34 against the left reel wheel 15 so that the wheel is directly driven from the motor pulley 33 to rewind the tape 14.

Another rubber belt 35 is trained over the right reel pulley 117 to drive an idler or intermediate wheel 37, which is rotatably mounted on a shaft secured to an arm 38, which in turn is pivoted at 41 to an angle bracket secured to the base plate 1.

Brakes 36 and 36' are mounted on respective brake arms 42 and 42' for restraining the rotation of the left and right reel wheels 15 and 67. The brakes are applied to the respective reel wheels to cause the latter to stop.

A tape counter 60 is provided to measure the length of the magnetic tape and is driven by a pulley 116 secured to the right reel wheel 67. The counter 60 includes a pulley 114 which is driven by the pulley 116 through a belt 115 and in turn drives the numerical wheels of the counter 60 in a conventional manner.

A reversing solenoid 54 is affixed to the base plate 1 and includes an armature 55 carrying a connecting rod 56, which is associated with an arm lever 51 pivoted at 69 to the base plate 1 to actuate the lever when the solenoid is operated. The lever 51 carries a stud 125 to which an operating rope 52 is secured.

The arm lever 51 also carries a pivot pin 126 on which an arm 128 is mounted. A pin 127 is secured to the arm 128 and a reversing roller 50 is pivotally mounted on the pin 127. A restoring spring 129 is secured to the arm 128. The rope 52 is trained over a guide roller 53 mounted on a pin 124 fast on the base plate 1 and is secured at the other end to a pad opener 57 pivotally mounted on a pin 58, which is secured to the subbase plate 2.

A head mounting plate 62 is screwed to the top of the subbase plate 2 adjacent to the left reel wheel and carries forward erase head 18. A pad plate 61 is hinged to the mounting plate 62 with a pad 120 of felt bonded to the pad plate for pressing the tape against the head to obtain a good contact therebetween. Secured to the subbase plate 2 on the right-hand side of head mounting plate 62 is another head mounting plate 64 carrying record and reproduce head 19 and a hinged pad plate 63 with a pad 121 bonded thereto. Secured to the subbase plate 2 on the right-hand side of the capstan 22 is a third head mounting plate 66 which carries a reverse record and reproduce head 20 and a hinged pad plate 65 having a pad 123 bonded thereto.

The pad opener 57 mounted on the subbase plate 2 has two tines for engaging the pad plates 63 and 65 for the forward and reverse heads 19 and 20, respectively. It will be understood that when the pad opener 57 is rocked in the direction indicated by the arrow C or C', it acts to swing the pad plate 65 or pad plates 61 and 63.

The switching operation from the normal to the reverse tape travel or vice versa will now be described in connection with FIGS. 4 and 5. FIG. 4 illustrates parts in the normal position including solenoid 54 in a deenergized state. As shown, the reversing roller 50 is out of contacting engagement with flywheel 31. Under these circumstances, power is transmitted from motor pulley 33 to flywheel 31 by way of the intermediate wheel or idler 46, the capstan 22 being rotated in the direction of the arrow B to drive the tape 14 in the direction indicated by the arrow A. With the solenoid 54 deenergized to release the rope 52, the pad opener 57 has been rocked in the direction of the arrow C under the bias of restoring spring 59 to engage the lower end of the pad plate 65 opposite to the reverse head 20 in the same manner as illustrated in FIG. 13 to move the pad plate 65 away from the head as indicated by the arrow C'' so that the tape 14 may pass freely over the front face of the head 20.

Figures 7, 8:
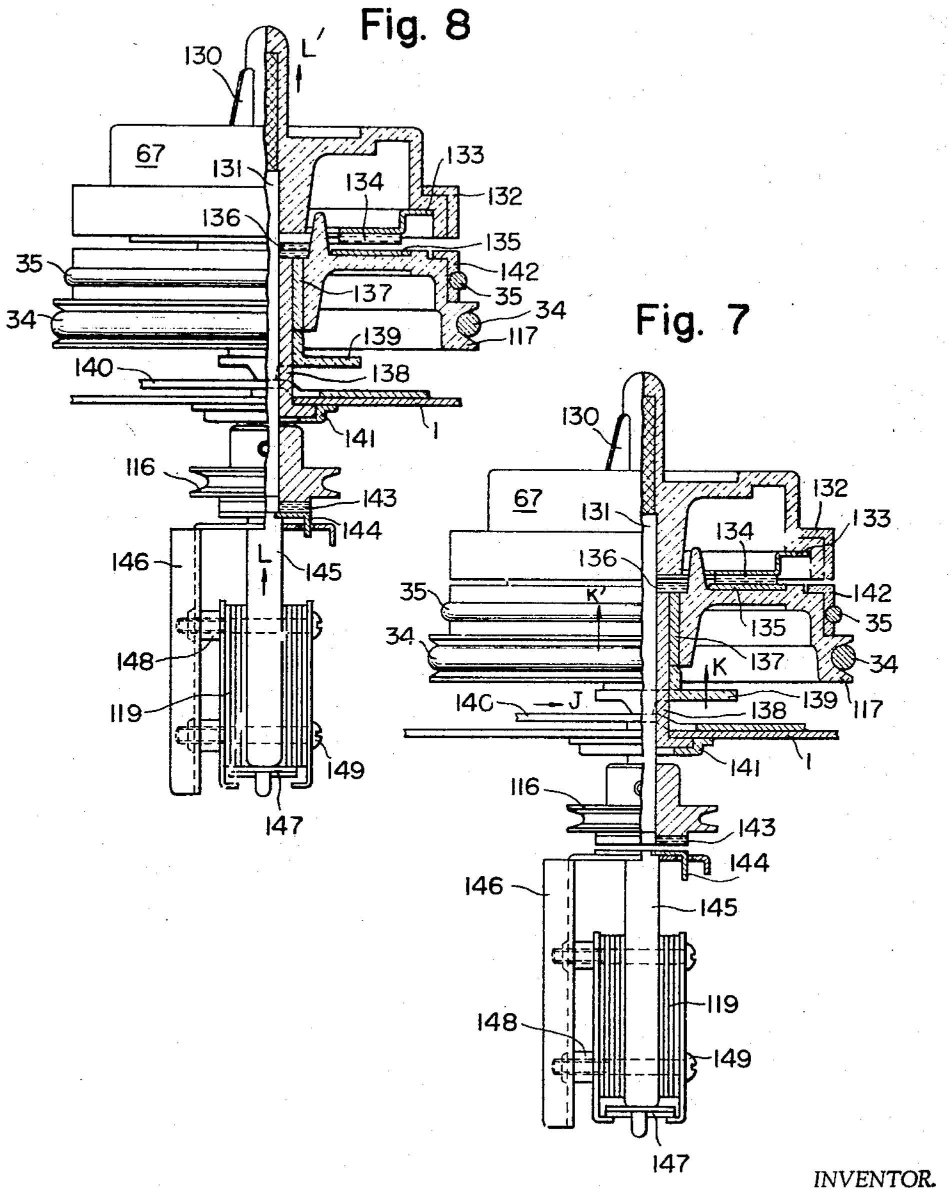
FIG. 7 is a view similar to FIG. 6 of the right reel wheel with its parts assuming the normal position.
FIG. 8 is a view similar to FIGS. 6 and 7 of the right reel wheel with its parts assuming the reverse position.

In the normal or forward travel position, the intermediate wheel 37 is spaced apart from the left reel wheel 15 while the right reel wheel 67 is driven by belt 34 through the intermediary of a friction member 134 interposed between the wheel and the right reel pulley 117 as shown in FIG. 7. Accordingly, the tape 14 embraced between the capstan 22 and pinch roller 26 is drawn at a constant speed from the left spool to be wound on the right spool.

In this manner, the magnetic tape 14 is pressed against heads 18 and 19 by respective pads 120 and 121 but is not pressed against head 20 by pad 123 and thus is wound under a light tension without unduly wearing the head 20, which is now inoperative.

Figure 5:
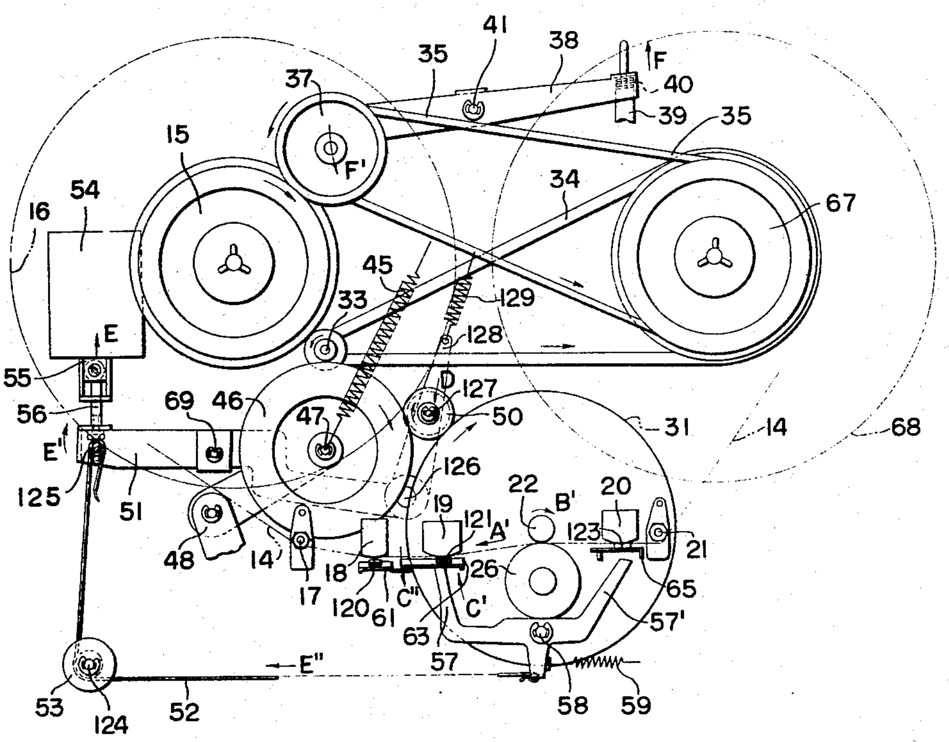
FIG. 5 is a view similar to FIG. 4 illustrating the same in the reverse position.

FIG. 5 illustrates parts in the reverse position. It is to be understood that, for example, a metal foil is fastened to the end of the forward track of the magnetic tape 14 so as to be sensed by left guide pole 17 to operate the solenoid 54 and also two other solenoids 118 and 119 shown in FIG. 3 which serve the purpose described hereinafter.

Figure 1:
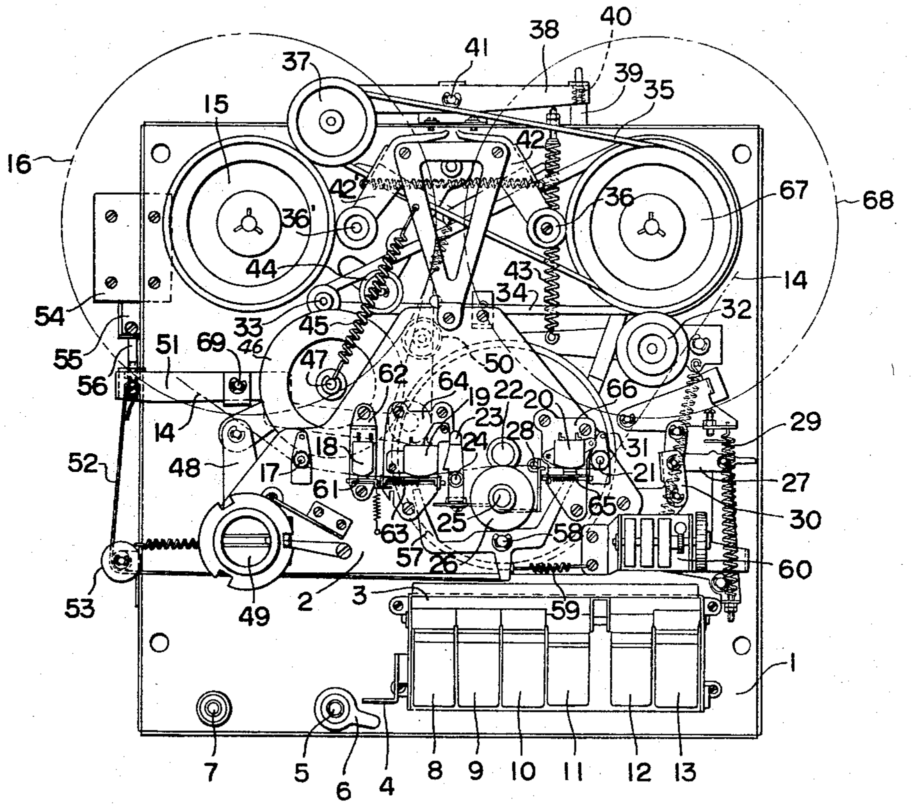
FIG. 1 is a top plan view of one embodiment of the invention.
Figure 2:
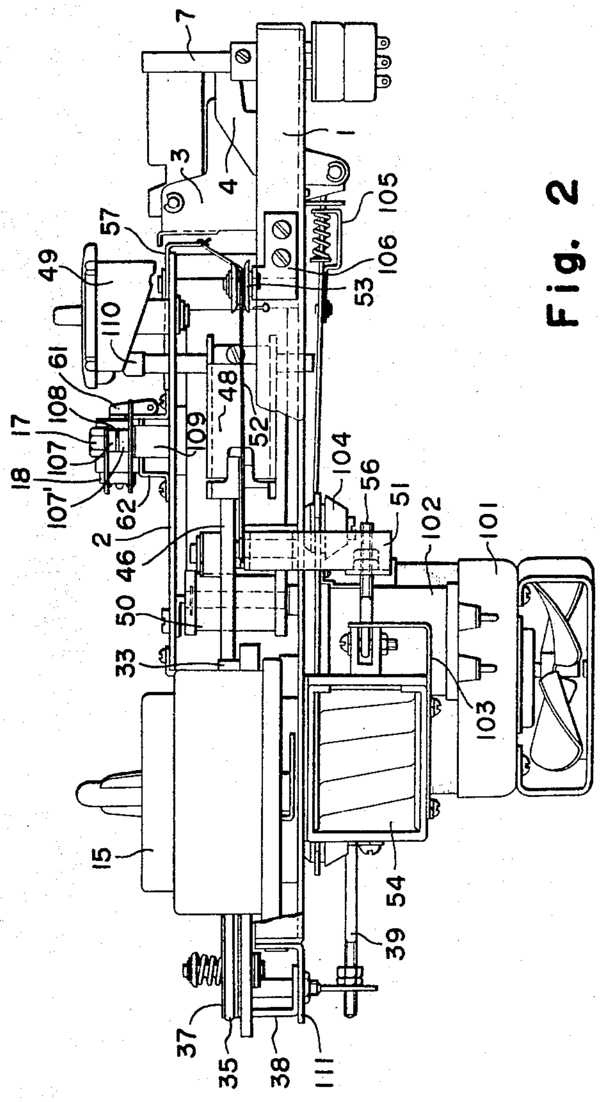
FIGS. 2 and 3 are a left and a right side elevation of same, respectively.
Figure 3:
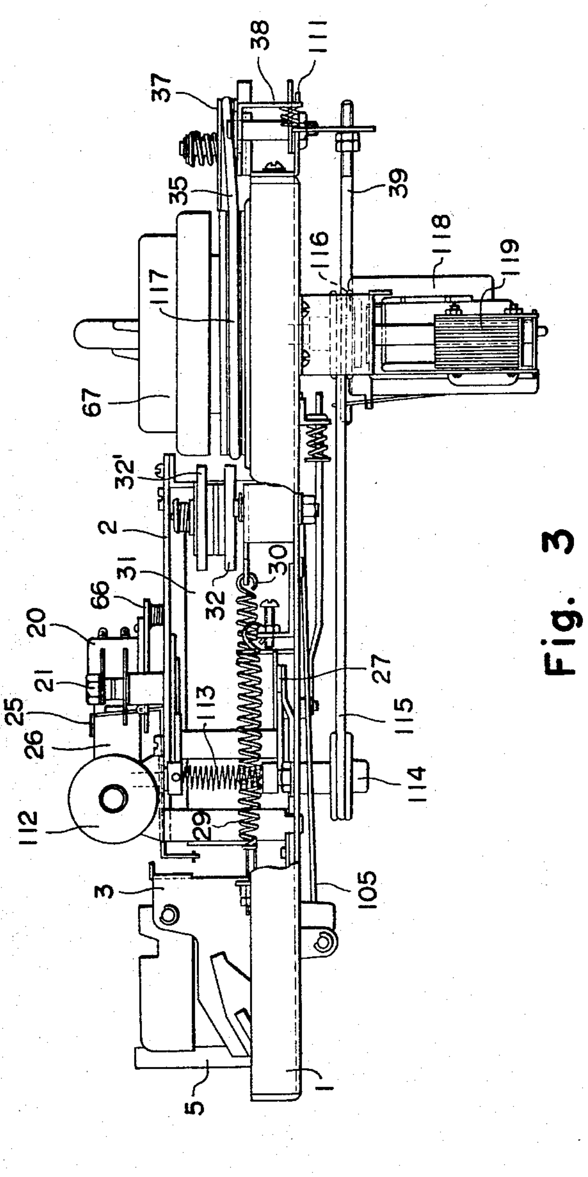

The left sensing and guide pole 17 includes, as shown in FIG. 2, a guide support 109, metal rings 107 and 107', and an insulator ring 108 interposed between the metal rings, which are secured to the guide support by a threaded bolt as shown and are electrically insulated from the bolt and the guide support. A terminal strip and tape guide plate is disposed in contact with each of the metal rings 107 and 107'. The metal foil fastened to the tape acts to short-circuit the two metal rings to operate a relay provided separately.

When the metal foil reaches the left sensing and guide pole 17 to operate the relay, the solenoid 54 is energized to attract the armature 55 in the direction of the arrow E (FIG. 5) to swing the arm 51 in the direction of the arrow E' by way of connecting rod 56 so that the rope 52 secured to the stud 125 on the arm 51 is pulled in the direction of the arrow E''.

Figure 11:
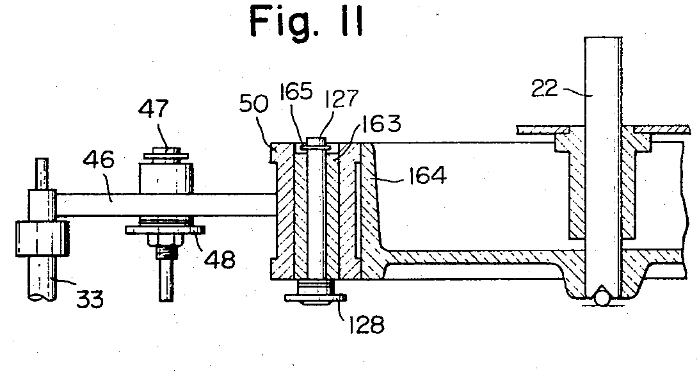
FIG. 11 is a view illustrating a modification of the power transmission illustrated in FIG. 10.

As the arm 51 is swung in the direction of the arrow E', the reversing roller 50 is moved in the direction indicated by the arrow D to be inserted between the intermediate wheel 46 and flywheel 31, as shown in FIG. 11. As a consequence, the direction of rotation of the capstan 22 is reversed as indicated by the arrow B' to drive the tape 14 in the opposite direction as indicated by the arrow A' though the motor pulley 33 rotates in the same direction.

Figures 6, 9:
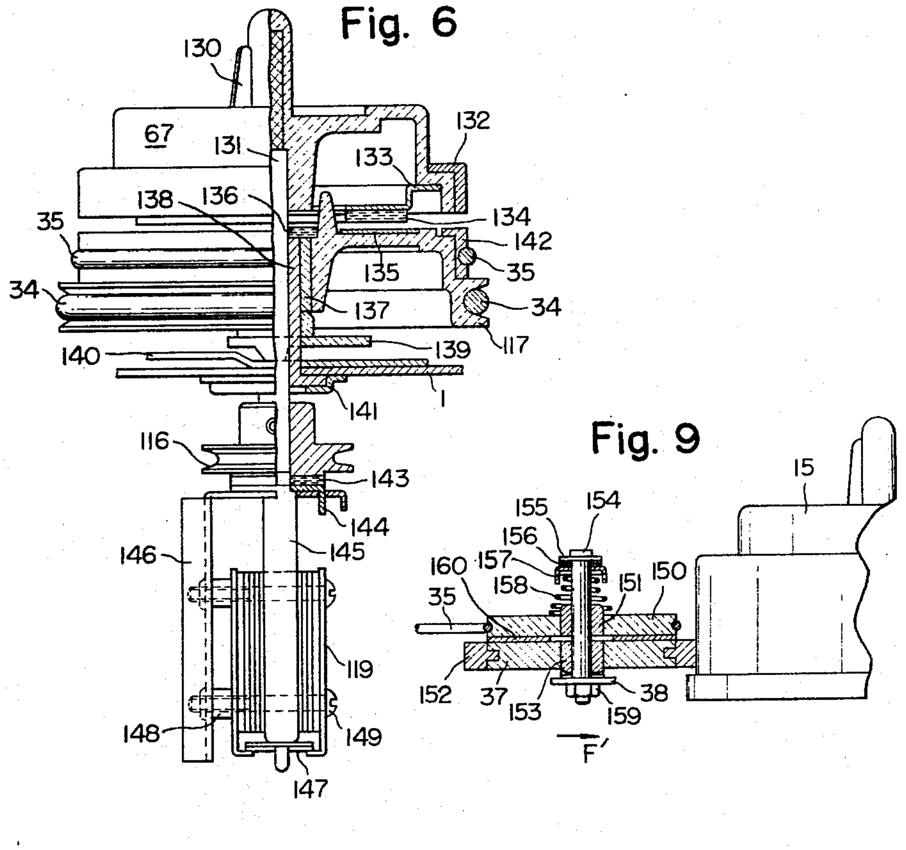
FIG. 6 is an elevational view, partly in section, of the right reel wheel with its parts assuming the stop-fast forward-rewind position.
FIG. 9 is a view showing the left reel wheel in the reverse position.

As the rope 52 is pulled in the direction E'', the pad opener 57 is rocked in the direction of the arrow C' to move the pad plates 61 and 63 for heads 18 and 19 away therefrom in the direction C'' while resiliently pressing pad 123 carried by the pad plate 65 against the reverse head 20 to hold the tape 14 in good contact therewith. Meanwhile, the solenoid 119 on the right reel wheel 67 is energized to attract its armature 147 in the direction of the arrow L, as shown in FIG. 8, so that the right reel wheel 67 is disengaged from the friction member 134 and thus rendered inoperative to wind the tape. On the other hand, the solenoid 118 operates in the direction of the arrow F (FIG. 5) to press the intermediate wheel 37 on the arm 38 against the left reel wheel 15 as illustrated in FIG. 9 so that the drive force of the belt 35 is transmitted through a friction member 160 to rotate the left reel wheel 15 in the direction as indicated in FIG. 5 to wind the tape 14 thereon.

As a result, the tape now proceeds from the right to the left reel until another metal foil, fastened to the tape 14 at the end of the reverse track, reaches the right sensing and guide pole 21, which is similar in structure to the left sensing and guide pole 17, when the relay previously energized is released to deenergize the solenoids 54, 118 and 119 and the apparatus is set to continue to operate this time again in the normal forward direction or brought to stop depending upon the setting of an appropriate electrical control circuit.

Upon restoration of solenoid 54, the reversing roller 50 is restored to the normal position as shown in FIG. 4 while the pad opener 57 is swung in the direction of the arrow C under the bias of spring 59 to the normal position as shown in FIG. 4. The restoration of solenoid 119 causes the right reel wheel 67 to assume the position shown in FIG. 7 while the restoration of solenoid 118 restores the intermediate wheel 37 to the position shown in FIG. 4.

Having described the normal and reverse operations of one embodiment of the present invention, it will readily be appreciated that the direction of tape travel can be reversed in a simple manner without the need of reversing the rotation of the drive motor or operating any mechanism of complicated structure.

Next, the construction and operation of the right reel wheel 67 will be described in detail with reference to FIGS. 6 to 8. Referring first to FIG. 6, which illustrates the right reel wheel 67 in the stop-fast forward-rewind position, the wheel 67 for receiving a spool is formed with spool engaging blades 130 and fitted over a shaft 131. A reinforcement 132 to be engaged by fast forward roller 32 and a disc 133 carrying friction member 134 as of felt are also secured to the wheel 67.

Screwed to the bottom of the shaft 131 is a pulley 116 for driving tape counter 60. A friction member 143 as of felt is fastened to the pulley 116 for imparting a suitable back tension to the tape so that it may not run unduly lightly while being rewound. The friction member 143 is held in contact with a friction disc 144 mounted fast on a shaft 145 arranged to be vertically moved by a movable member 147 of the solenoid 119.

A tubular bearing 138 is secured to the base plate 1 by means of a retainer 141 with the shaft 131 fitted rotatably through said bearing 138, which is fitted in a bearing sleeve 137 on which the right reel pulley 117 is rotatably mounted.

Trained over the right reel pulley 117 are a belt 34 driven by motor pulley 33 and a belt 35 for driving intermediate wheel 37. A reinforcement member 142 and a friction disc 135 for slidably engaging friction member 134 are secured to the right reel pulley 117, as shown. An oil retainer 136 is formed on the right reel pulley 117. A control member 139 is mounted in engagement with the bearing sleeve 137 in overlying relation to a lever 140 operably connected with record and reproduce pushbutton 11 for determining the level of the lever 140.

In the position shown in FIG. 6, since the friction member 134 is apart from the friction disc 135, the right reel wheel 67 remains at rest even if the right reel pulley 117 is rotated.

Upon depression of pushbutton 11, lever 140 is moved in the direction of the arrow J in FIG. 7 so that a raised portion of the lever engages the control member 139 to raise the right reel pulley 117 with the control member 139. As a result, the friction member 134 is engaged by friction disc 135 so that the reel wheel 67 is frictionally driven by the belt 34.

Upon reversal of the tape travel, solenoid 119 is energized to move the friction disc 144 on the vertically movable shaft 145 in the direction of the arrow L in FIG. 8 to push up the shaft 131 of the reel wheel 67. Accordingly, the reel wheel 67 is raised as indicated by the arrow L' to move the friction member 134 away from the friction disc 135 so that the drive force is not applied to the reel wheel 67.

When the apparatus is set for normal forward operation, the solenoid 119 is deenergized so that the reel wheel 67 is lowered back to its normal position to be driven through the engagement of the friction member 134 with friction disc 135.

In this manner, the switching between the normal and reverse operation can be effected simply by raising and lowering the reel wheel 67 under the control of the solenoid 119.

The construction and operation of the intermediate wheel will next be described in detail in connection with FIG. 9. The wheel assembly includes a pulley 150 connected with right reel wheel 67 by belt 35, and an idler or intermediate wheel 37 shown in FIG. 9 in engagement with left reel wheel 15. A bearing member 153 is forcedly fitted in the intermediate wheel 37 with a rubber tire 152 fitted about the periphery thereof. The pulleys 150 and 37 have a friction member 160 compressed therebetween under the bias of a spring 158 to form an integral assembly rotatably mounted on a shaft 154 carried by arm 38. Accordingly, the drive force of the belt 35 is imparted through friction member 160 to the left reel wheel 15 with the intermediate wheel 37 pressed against the reel wheel in the direction of the arrow F'. Numeral 159 indicates a nut; 157 a dished spring seat; 156 a washer; and 155 a snap ring.

Figure 10:
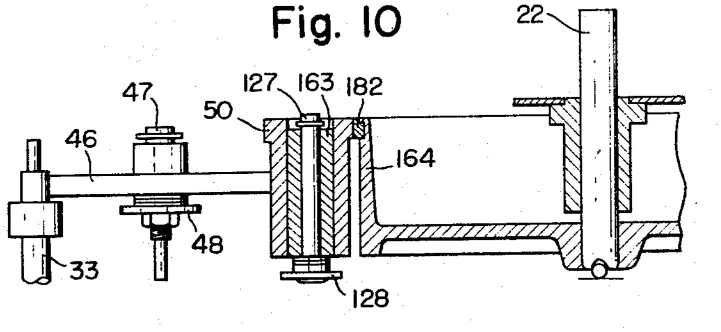
FIG. 10 illustrates the power transmission from the motor pulley to the flywheel during the reverse operation.

Referring to FIGS. 10 and 11, which illustrate two forms of power transmission from motor pulley 33 to flywheel 31 through reversing roller 50, motor pulley 33 has three different diameter portions corresponding to respective speeds of tape travel. The idler or intermediate wheel 46 is positioned opposite to any selected diameter portion of the motor pulley 33 by means of speed change knob 49.

The reversing roller 50 has two different diameter portions to engage with the idler wheel 46 and flywheel 31. The diameter of that roller portion which engages the intermediate wheel or idler 46 is smaller than that of the roller portion engaging the flywheel 31.

The reason for this is as follows. Experiments have shown that, if the reversing roller 50 has a uniform outside diameter throughout its axial length, the rotative speed of flywheel 31 will be reduced about 5% when the reversing roller 50 is inserted between the idler wheel 46 and flywheel 31, even though the rotative speed of motor pulley 33 is not reduced.

The reduction in speed of the flywheel can be prevented by forming on the roller 50 two different diameter portions as described above. During normal operation, the idler wheel 46 engages the reduced diameter portion of the flywheel 31 irrespective of the speed of tape travel. On the other hand, during reverse operation, the idler wheel 46 engages the smaller diameter portion of the reversing roller 50 irrespective of the speed of tape travel, while the flywheel 31 is engaged solely by the larger diameter portion of the reversing roller so that the reduction in speed of the flywheel otherwise occurring during the reverse operation is compensated for enabling the flywheel to be driven at the same rotative speed as that during the normal forward operation.

FIG. 10 illustrates one form of reversing roller 50 the top portion of which alone has an enlarged diameter portion to cooperate with a high friction material 182 such as rubber fastened to the flywheel or to the larger diameter portion of the reversing roller 50. FIG. 11 illustrates another form of reversing roller 50 having a top and a bottom enlarged diameter portions.

The reversing roller 50 is forcedly fitted over shaft 127 by way of a bearing 163 and axially held in place by a snap ring 165.

The operation of the magnetic head assemblies of the apparatus will now be described in connection with FIGS. 12 to 14. To start the apparatus previously held at rest for forward record and reproduction, button 11 is depressed to cause the link mechanism 27 to move pinch roller 26 in the direction of the arrow M′ to press the tape 14 against the capstan 22.

The tape guide pole 24 is carried by a tape shifter 23 and movable with pinch roller 26 so that the pad plate 63 is pressed against head 19 under the bias of a spring 169. Pad opener 57 is arranged normally to engage the pad plate 65 for reverse head 20 while not engaging pad plates 61 and 63 for forward heads 18 and 19 under the bias of spring 59, as shown in FIG. 4.

Upon reversal of the operation, the solenoid 54 acts to move rope 52 in the direction of the arrow E″ in FIGS. 5 and 13 so that the pad opener 57 is released from the pad plate 65 for reverse head 20 to allow the pad 123 to engage the head 20 while at the same time striking pad plates 61 and 63 for forward heads 18, 19 to move the plates 61, 63 away therefrom.

Upon stoppage, pinch roller 26 is moved in the direction of the arrow M (FIG. 14) away from the capstan 22 and with it tape shifter 23 is moved also in the direction M so that pad plates 61, 63 and 65 for the forward and reverse heads are moved away from the respective heads by a lug 23′ on the tape shifter 23 and the tape 14 is moved apart from the heads 18, 19 and 20 by the tape shifter 23. In this case, it is to be understood that the pads are moved apart from the respective heads irrespective of the position of the pad opener 57.

The heads are mounted on a mounting plate 64, which in turn is secured to the subbase plate 2 by fastening screws 168 through the intermediary of adjusting springs 171. The pad plate 63 is hinged or swingably secured to the mounting plate 64 by way of a pin 170 and the pad carried by the pad plate 63 is normally held in pressure contact with the head under the bias of a spring 169 serving the purpose.

Another embodiment of the present invention will now be described in connection with FIGS. 15 to 18 inclusive, which illustrate only parts required for the normal forward and reverse tape travel with mechanisms including fast-forward and rewind rollers omitted for simplicity's sake.

A drive belt 34 is trained over a motor pulley 33, a right reel wheel 67, and an idler 176 to drive a left reel wheel 15. An actuating bar 174 underlies the right and left reel wheels and is connected at one end with a connecting rod or link 173 secured to a solenoid 172, which is fitted with a restoring spring 175.

FIG. 15 illustrates parts in the normal position while FIG. 16 illustrates them in the reverse position. Upon reversal, solenoids 54 and 172 are operated in the respective directions indicated by the arrows E and F. The operation of the solenoid 54 is similar to that described in connection with FIG. 5. Upon operation of the solenoid 172, the actuator bar 174 is moved in the direction of the arrow F to render the right reel wheel 67 ineffective while enabling the left reel wheel 15 to wind the tape 14.

The construction of the reel wheels is illustrated in FIGS. 17 and 18 and being generally similar to that shown in FIGS. 6, 7 and 8 will not be described in any detail.

During the normal or forward operation, the left reel wheel 15 is in a state shown in FIG. 17 and the right reel wheel 67 is in a state shown in FIG. 18. Thus, the friction member 134 on the left reel wheel 15 is held apart from friction disc 135 to render the wheel free from the drive force of the belt 34, but the right reel wheel 67 with the friction member 134 thereon in engagement with the friction disc 135 is driven by the belt to wind the tape 14.

For the reverse operation, the solenoid 172 operates to move the actuator bar 174 so that the left and right reel wheels assume the position shown in FIGS. 18 and 17, respectively. Thus, the relationship between the left and right reel wheels 15 and 67 during the reverse operation is opposite to that during the normal operation so that the tape 14 proceeds to be wound on the left reel wheel 15.

FIGS. 19 to 29 illustrate a further embodiment of the invention, which is generally similar to the first embodiment shown in FIGS. 1 to 5 except the following features.

The subbase plate 2 carries on top of it an erase head 18 and a record and reproduce head 19 for forward operation and an erase head 78 and a record and reproduce head 20 for reverse operation. Also carried on the subbase plate 2 are pad openers 88, 89 associated with the solenoid 54 and a pad opener 90–90′ associated with the pinch roller (FIG. 22).

A connecting rod 77 is secured by screw means 76 to the armature 55 of the solenoid 54 for the reversing roller 50 and is pivoted at the other end to an arm 81 as at 91, to which arm is pivoted another arm carrying the reverse roller 50. A restoring spring 59 is arranged to bias the connecting rod in one direction.

A reverse idler and rewind pulley 72 is mounted on a shaft 73 secured to an arm 71 (FIG. 19), which is rotatably mounted on a pin 70 fixed to the base plate 1. A belt 34 is trained over the idler pulley 72.

Brakes 74 and 75 are provided for restraining the rotation of the left and right reel wheels 15 and 67, respectively.

Also in this embodiment, solenoids 119 and 119′ are provided for the respective reel wheels.

Referring particularly to FIGS. 22, 23, and 24, which illustrate only those parts relating to the basic operations of the embodiment, reference numeral 32 indicates a fast-forward roller which is movable in the direction of the arrow to be pressed against the reinforcement portions 132, 142 of the right reel wheel 67 to allow the latter to be driven by the belt 34.

FIG. 22 shows parts in the stop position in which idler 46 is apart from both motor pulley 33 and flywheel 31 and no drive force from the motor is transmitted to the capstan 22. Pad plates 61, 63, 65 and 80 are held apart from heads 18, 19, 20 and 78 by pad opener 90–90′, which is movable with pinch roller 26, and thus the tape 14 can readily be threaded or removed.

Upon depression of the button 11 for normal recording and reproduction, the pinch roller 26 is moved to press the tape against the capstan 22 so that the tape is advanced at a predetermined speed in the direction of the arrow A (FIG. 23). Pad opener 90–90′ is disengaged from pad plates 61, 63, 65 and 80 but pad opener 89 is held in abutting relation to the bottom end of pad plates 65 and 80 under the bias of restoring spring 59. Accordingly, the pad plates 65 and 80 for reverse operation are not in a position to press the tape 14 against heads 20 and 78, but pad plates 61 and 63 for normal operation are effective to press the tape against heads 18 and 19, as shown in FIG. 25.

Pins 82 and 86 are secured to the subbase plate 2 and a two-arm lever 87 pivotally mounted on one of said pins 86 is connected at opposite ends with pad openers 88 and 89 by way of pins 84 and 85, respectively. The lever 87 is formed with a notch to receive a pin 83 carried by arm 81 associated with solenoid 54 by way of connecting rod 77.

Description will now be made on the reel wheels with reference to FIG. 28 and 29. The right reel wheel 67 includes a solenoid 119 having a restoring spring 184 and a movable member 147, which is attracted in the direction of the arrow R when the solenoid is energized (FIG. 29). As a result, friction member 143 is disengaged from friction disc 144 to allow the reel wheel 67 to descend under gravity until the friction member 134 thereon engages friction disc 135 so that the reel wheel 67 is driven by belt 34 by way of friction member 134. Numeral 183 indicates a sleeve for determining the vertical position of the reel wheel 67. On the other hand the left reel wheel 15 with its solenoid 119′ deenergized is held in a position shown in FIG. 28 with the friction member 134 on the wheel disengaged from the friction disc 135 and thus is free from the driving force of the belt 34. It follows that the tape 14 is payed out from the spool 16 on the left reel wheel 15 to be wound on spool 68 on the right reel wheel 67.

Under these circumstances, the tape 14 travels in the direction of the arrow A (FIG. 19) until a metal foil fastened to the end of the tape reaches left tape sensing and guide pole 17 constructed as described in connection with FIG. 2 when the arrival of the metal foil is sensed by the pole to energize the solenoid 54. As a result, the armature 55 of the solenoid is moved in the direction of the arrow E. Simultaneously with this, the solenoid 119 associated with the right reel wheel 67 is deenergized to allow the reel wheel to rise in the direction of the arrow R′ under the bias of restoring spring 184 (FIG. 28) while the solenoid 119′ associated with the left reel wheel 15 is energized to attract the movable member 147 in the direction of the arrow R to carry the friction member 134 on the wheel into engagement with the friction disc 135.

Upon operation of the solenoid 54, the connecting rod 77 is moved in the direction of the arrow E′ (FIG. 24) to swing the arm 81 about pin 82 in the direction of the arrow D so that reversing roller 50 is forced into the space between the idler 46 and flywheel 31 and the rotation of the capstan 22 is reversed into the direction B′ to advance the tape 14 in the opposite direction indicated by the arrow A′.

When the arm 81 is swung, pin 83 carried thereon is moved in the direction D′ to rock the lever 87 about pin 86. Consequently, pad openers 88 and 89 are caused to slide in the respective directions C′ and C. The pad opener 88 thus engages one end of pad plate 63 to move it apart from the forward heads 18 and 19 as shown in FIG. 26 while the pad plates 65 and 80 for the reverse heads 20 and 78 are released by the pad opener 89 so that the tape 14 is pressed by pads 123 and 79 against heads 20 and 78, respectively as with the case of the forward head shown in FIG. 25.

Upon stoppage, as the pinch roller 26 is moved apart from the capstan 22, pad opener 90–90′ associated with the pinch roller 26 is moved in the direction of the arrow P‴ and one extremity 90′ of the pad opener acts to move the pad plate 63 further apart from the head in the direction of the arrow Q (FIG. 27).

As apparent from the foregoing, this embodiment has a further simplified structure compared with the preceding embodiments and can effect reversal of the operation in a shorter length of time involving only movement of an extremely limited number of associated parts operably by solenoid means.

In reversing the normal forward operation, the reversing roller 50 arranged angularly to wedge into the space between the idler 46 and flywheel 31 is effective to rapidly reverse the direction of rotation of the flywheel. Also, in restoring the normal forward operation from the reverse operation, the direction of rotation of the flywheel 31 is rapidly reversed since the idler 46 is also arranged angularly to wedge into the space between the motor pulley 33 and flywheel 31.

Some forms of magnetic recording and reproducing apparatus have previously been known which are adapted to repeat such switching between the normal and reverse operations. Most of these apparatus particularly those including entirely mechanical means for the purpose which is manually operable have necessarily been complicated in structure and the operator has had to watch the end of the tape for changing the direction of its travel or to operate paying attention to the end or pauses of the music being played. In addition, the operator has been required to remember the points of direction change during the tape recording operation so that during reproduction the direction of tape travel may be changed properly in accordance with the contents of the recorded subject without any possibility of the subject being reproduced contrariwise.

A known apparatus designed to automatically effect such switching or reversing operation has been a very expensive recorder employing three motors including a motor for driving the capstan. With this apparatus, the direction of tape travel cannot be changed rapidly since the rotation of the capstan motor itself must also be changed for the purpose. This means that the tape must be run at a speed other than that specified for a substantial length of time and therefore the change of the direction of tape travel must be effected during the interruption of the subject being recorded.

In contrast, the automatic magnetic recording and reproducing apparatus of the present invention is capable of automatically reciprocating the tape to record or reproduce any desired item in a substantially uninterrupted fashion since it includes a reversing roller arranged in the power transmission between the motor pulley and the capstan so as to be rendered effective or ineffective in accordance with a signal obtained from a signal device such as a metal foil carried by the tape per se and thus the direction of rotation of the capstan is changed rapidly without changing the direction of rotation of the drive motor.

As a modification, the apparatus of the present invention may include a manually operable electric switch arranged in parallel with the device for sensing the arrival of a metal foil being carried by the tape so that the direction of tape travel may be changed at any desired point and even if the tape carries no metal foil or other signal device.

A further advantage of the invention is that the service life of the tape and the magnetic heads of the apparatus is substantially extended because of the arrangement in which only those heads necessitated depending upon the direction of tape travel are engaged by the associated pads to hold the tape in pressure contact with such heads while minimizing the frictional wear of the remaining inoperative heads caused by the tape passage thereover and the tension to which the tape being wound on a take-up spool is subjected.

It will be appreciated that the apparatus of the invention may be obtained by a slight alteration of a conventional mechanical type magnetic tape recording and reproducing apparatus and at a reasonable cost without involving any complicated structure. In addition, the apparatus of the invention being of the automatic reciprocating type is capable of recording and reproducing any desired item uninterruptedly for an extended length of time and thus is valuable for use not only in enjoying music, recording conferences, and furnishing a background music in factories, hotels, shops, etc. but can also be used in common households with ease just like auto record changers.

Having described some preferred embodiments of the invention, it is to be understood that it is not to be restricted to any details set forth herein but many changes and modifications may be made without departing from the spirit of the invention and the scope of the annexed claims.

What is claimed is:

1. An automatic reciprocating magnetic tape recording and reproducing apparatus for use with a magnetic tape having at least two recording tracks comprising a drive pulley, a capstan, an idler wheel adapted to transmit drive power from said drive pulley to said capstan, a flywheel integral with said capstan, a reversing roller arranged between said idler wheel and said flywheel, means for changing the direction of tape travel at an appropriate time during the tape travel, and means for moving said reversing roller into and out of engagement with said idler wheel and said flywheel to change the direction of rotation of said capstan whereby the tape is reciprocated to effect uninterrupted recording and reproducing operations, said reversing roller having portions with different diameters, one of said portions being of a smaller diameter and extending axially for a distance at least long enough to allow the rim of said idler wheel to be in engagement with said smaller diameter portion of the reversing roller to effectively change its speed, the other of said portions being of a larger diameter substantially equal in length to the thickness of the idler wheel rim, said portion with a larger diameter being adapted to be brought into engagement with the rim of said flywheel and compensate for the decrease in the speed of rotation of said capstan flywheel when said reversing roller intervenes between the idler wheel and the flywheel.

2. An automatic reciprocating tape recording and reproducing apparatus according to claim 1 wherein said flywheel has a friction member made of a high friction material fastened to the periphery of that portion of said flywheel which is engageable with that portion of said reversing roller having the larger diameter.

3. An automatic reciprocating magnetic tape recording and reproducing apparatus according to claim 1 wherein said reversing roller has a friction member made of a high friction material fastened to that portion of said reversing roller with the larger diameter.

4. An automatic reciprocating magnetic tape recording and reproducing apparatus according to claim 1 wherein said idler wheel is disposed at a position such that the tangential line passing through the point of contact of the drive pulley and the idler wheel and extending in the direction of rotation of said drive pulley is substantially in the same direction as the direction of advancement of the idler wheel between said drive pulley and said flywheel, and said reversing roller is disposed at a position such that the tangential line passing through the point of contact of said reversing roller and said idler wheel and extending in the direction of rotation of said idler wheel is substantially in the same direction as the direction of the advancement of said reverse rolling between said idler wheel and the flywheel.

5. An automatic reciprocating magnetic tape recording and reproducing apparatus for use with a magnetic tape having at least two recording tracks comprising a drive pulley, a capstan, an idler wheel, adapted to transmit drive power from said drive pulley to said capstan, a flywheel integral with said capstan, a reversing roller arranged between said idler wheel and said flywheel, means for changing the direction of tape travel at on appropriate time during the tape travel, and means for moving said reversing roller into and out of engagement with said idler wheel and said flywheel to change the direction of rotation of said capstan whereby the tape is reciprocated to effect uninterrupted recording and reproducing operations, in which said reversing roller has portions with different diameters, one of said portions being of a smaller diameter extending axially for a distance at least long enough to allow the rim of said idler wheel to be in engagement with said smaller diameter portion of the reversing roller to effectively change its speed, at least two other portions being a larger diameter, the sum of the thickness of the larger diameter portions being substantially equal in length to the thickness of the idler wheel rim, said larger diameter portions being disposed to have said portion with a smaller diameter therebetween, said larger diameter portions being adapted to be brought into engagement with the rim of said flywheel and compensating for the decrease in the speed of rotation of said capstan and said flywheel when said reversing roller intervenes between the idler wheel and the flywheel.

6. An automatic reciprocating magnetic tape recording and reproducing apparatus for use with a magnetic tape having at least two recording tracks wherein the tape is reciprocated to effect uninterrupted recording and reproducing operations comprising a drive pulley, a capstan, a pinch roller, an idler wheel adapted to transmit a drive power from said drive pulley to said capstan, a flywheel integral with said capstan, a reversing roller arranged between said idler wheel and said flywheel, means for changing the direction of tape travel at an appropriate time during the tape travel, and means for moving said reversing roller into and out of engagement with said idler wheel and said flywheel to change the direction of rotation of said capstan, forward and reverse heads and pads associated therewith, pad opening means for moving said pads associated with said forward heads apart therefrom when said reversing roller is moved into engagement with said idler wheel and said flywheel, and for moving said pads associated with said reverse heads apart therefrom when said reversing roller is moved out of engagement with said idler wheel and said flywheel, said pad opening means being movable in association with said pinch roller to move both the forward and the reverse head pads apart from their corresponding heads when the apparatus is set for stop, fast forward, and rewind irrespective of the direction of tape travel, and means for effecting pivotal movement of a lever equipped with said reversing roller and for effecting pivotal movement of said pad opening means for selectively urging said forward head pads and the reverse head pads towards and away from their corresponding heads and also for effecting movements of said reversing roller into and out of engagement with said idler wheel and said flywheel.

7. An automatic reciprocating magnetic tape recording and reproducing apparatus for use with a magnetic tape having at least two recording tracks in which the tape is reciprocated to effect uninterrupted recording and reproducing operations comprising a drive pulley, a capstan, an idler wheel adapted to transmit drive power from said drive pulley to said capstan, a flywheel integral with said capstan, a reversing roller arranged between said idler wheel and said flywheel, means for changing the direction of tape travel at an appropriate time during the tape travel and means for moving said reversing roller into and out of engagement with said idler wheel and said flywheel to change the direction of rotation of said capstan, reel pulleys and reel wheels, said reel pulleys being disposed to be brought into engagement with said reel wheels, said reel pulleys being rotatable about shafts respectively secured to said reel wheels, one of said reel pulleys being adapted to be driven by means of a belt, the other reel pulley being adapted to be driven by means of an intermediate wheel, said reel wheels being supported for vertical movement by bearings secured to a base plate and further being provided with a friction member on the face abutting the reel pulley to be brought into engagement with the face of said reel pulley, solenoids provided at the lower end of each of said shafts, one of said solenoids being energized to agree with the travel direction of the tape to effect vertical movement of said reel wheel and to frictionally couple only the reel wheel assigned for winding the tape with said reel pulley so that the tape may be wound.

References Cited by the Examiner

UNITED STATES PATENTS

| | | | |
|---|---|---|---|
| 2,705,639 | 4/1955 | Lekas | 242—55.12 X |
| 2,858,996 | 11/1958 | Switzer | 242—55.12 |
| 2,873,926 | 2/1959 | Roberts | 242—55.12 |
| 2,978,198 | 4/1961 | Bierman | 242—55.12 |
| 3,050,225 | 8/1962 | Ulman | 242—55.12 X |

FRANK J. COHEN, *Primary Examiner.*

GEORGE F. MAUTZ, *Examiner.*